INVENTORS
WILLIAM HENRY PENLEY
CECIL JOHN WAYMAN
BY
ATTORNEY

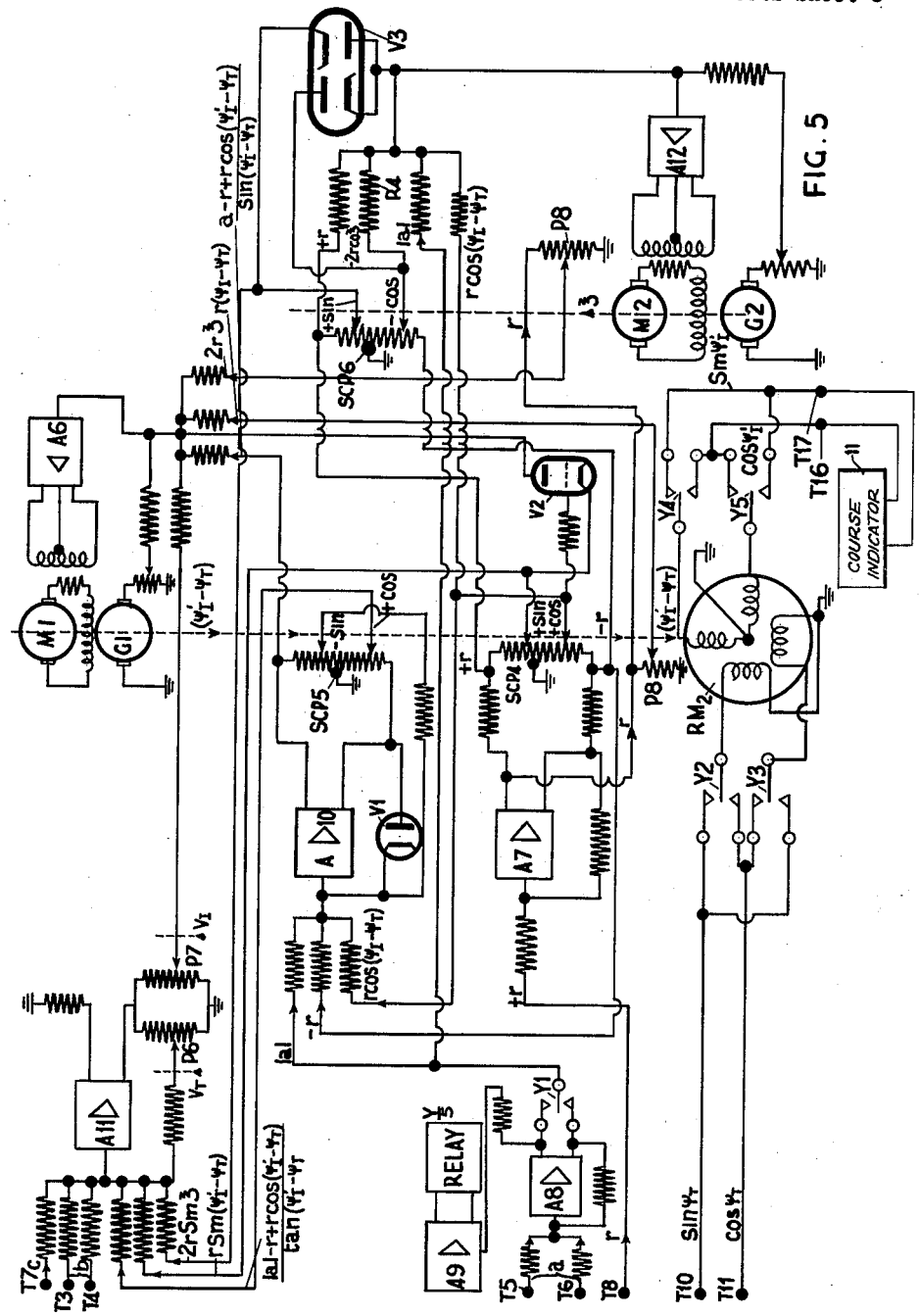

United States Patent Office

2,979,262
Patented Apr. 11, 1961

2,979,262

INTERCEPTION COMPUTERS FOR AIRCRAFT OR THE LIKE

William Henry Penley, 6 Western Close, Great Malvern, England, and Cecil John Wayman, 68 Old Church Lane, Stanmore, England Filed Oct. 26, 1953, Ser. No. 388,358

Claims priority, application Great Britain Oct. 31, 1952

3 Claims. (Cl. 235—187)

The present invention relates to interception computers for use in conjunction with a system, for example a search radar system, for deriving information as to the presence and movement of other aircraft or the like in the vicinity of a given aircraft, the computer being used to provide information for guiding the given aircraft on a manoeuvre suitable for intercepting one or a given group of others. More particularly, but not exclusively, the invention relates to such computers for use in an aircraft in conjunction with a search radar system mounted in the aircraft.

It is an object of the present invention to provide an interception computer as set out above in which the type of interception manoeuvre employed as a basis for computation is of novel and simple form, and in which the information is given simply, for example as a meter indication showing fly left, right or straight ahead.

In the accompanying drawings in which is shown one of the various possible embodiments of our invention, Figure 1 diagrammatically illustrates a large number of different interception manoeuvres;

Figures 4 and 5 show circuit diagrams of different parts of a computer mechanism constructed in accordance with our invention.

In designing interception computers in accordance with the present invention, it was decided to adopt a standard type of interception manoeuvre for the interceptor, which it is thought in certain circumstances gives a number of advantages. In all cases it is assumed that the course and speed of the target will remain constant from a datum time at which the interception computation and manoeuvre is initiated. It is also assumed that the interceptor is at approximately the same height as the target, having been directed to that end from the ground.

Figure 1:
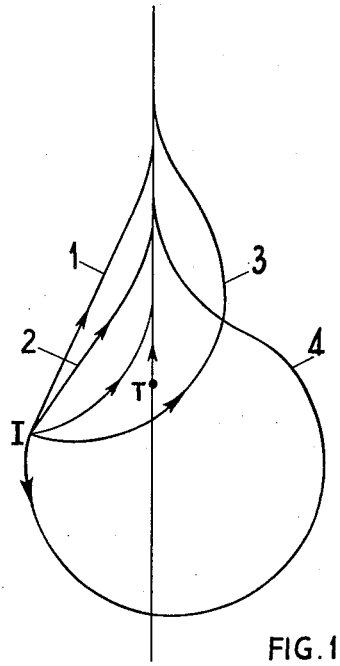

The interception maneouvre adopted is illustrated in Figure 1 of the accompanying drawings in which I represents the initial position of the interceptor and T that of the target. The arrows show the directions of flight. To deal first with the end of the manoeuvre, it is arranged that the interceptor, which continuously flies at its maximum speed, turns on to the course of the target from one side or the other, with a turn of its minimum turning radius flying in the same direction as the target and at a predetermined distance, known in this specification as the "in-behind" distance, behind the target. From this position the interception may be completed visually or using some form of lock-follow radar system. Alternatively an attack with a guided missile may be delivered from this point, as circumstances may require.

The rest of the manoeuvre before the final turn may be divided into two types, the actual type required being determined by the relative positions of the target and the interceptor at the moment of initiation of the manoeuvre.

In the simplest type of manoeuvre, as illustrated by the paths 1 and 2 in Figure 1, the interceptor flies down a straight path at its maximum speed before making the final turn, and possibly makes a turn, again at its minimum turning radius, before commencing the straight path, in order to attain the required course as quickly as possible. In the other type of manoeuvre, as illustrated by the paths 3 and 4, it is necessary in effect for the interceptor to lose some time, and it flies on a circle of the minimum turning radius of the opposite curvature to the final turn, crossing the target course in so doing. In this case the interceptor is initially too near the target course line to turn on to it with a turn even at its minimum turning radius. These two types of interception manoeuvre will be designated respectively "the simple type of pursuit interception manoeuvre" and "the crossing course type of pursuit interception manoeuvre," and these terms where used in this specification, including the claims, are to be interpreted in accordance with the explanation given in this paragraph. The mathematical conditions governing the distinction between the two types of manoeuvre are given later in this specification.

According to the present invention an interception computer for guiding a given aircraft or the like (hereinafter called "the interceptor") on one of the two types of pursuit interception manoeuvre, namely the simple and the crossing course types of manoeuvre, to arrive at a predetermined distance (hereinafter called the "in-behind distance") behind and on the same course as one or a body of other aircraft or the like (hereinafter called "the target") comprises means for deriving information as to the position, course and speed of the target, means for deriving and/or setting on information as to the position, course, speed and minimum turning radius of the interceptor, and the in-behind distance, means responsive to the initial relative positions and courses of the target and the interceptor and the magnitude of the minimum turning radius of the interceptor for setting up the computer to operate for the appropriate one of the two types of pursuit interception manoeuvre, means for computing the time taken from a datum time for the interceptor to complete the appropriate type of interception manoeuvre, the initial value of the course for the interception manoeuvre defined and utilised in the computer being arbitrarily determined initially, means for computing the time taken from the same datum time, for the target to fly on its present course, which it is assumed to maintain, to the point further along that course by the in-behind distance than the point at which the interceptor will fly on to it, means responsive to the difference of the two computed times for continuously adjusting the value of interception manoeuvre course in the computer to the correct one for which the time difference becomes zero, and means for indicating the interception manoeuvre course defined in the computer.

The calculation to be carried out in the computer is of two different types, corresponding to the two types of manoeuvre, although the basic principle in each case is the same. The basic principle used is to compute the two times required for the target and the interceptor to reach their interception positions as a function of $(\psi_\mathrm{I}' - \psi_\mathrm{T})$ and the various constants of a given set of data where $\psi_\mathrm{I}'$ is the correct interceptor course to fly and $\psi_\mathrm{T}$ is the target course. The difference of these times is fed to the input of a servo system, the motor of which drives a shaft through angles $(\psi_\mathrm{I}' - \psi_\mathrm{T})$. The system comes to rest when the times are equal, and $(\psi_\mathrm{I}' - \psi_\mathrm{T})$ has the value appropriate to a correct interception. Knowing $\psi_\mathrm{T}$, $\psi_\mathrm{I}'$ is derived, and displayed or used as desired, for example as a correct heading marker on a P.P.I. display, as a course correction angle $\psi_I' - \psi_I$, $\psi_I$ being the actual heading, on a meter, or as a shaft rotation $\psi_I' - \psi_I$ fed to an auto-pilot.

The mathematical basis of the computations carried out will now be given, followed by a description of one example of an electrical computer for solving the various equations. The mathematical basis will be investigated for the two different types of interception manoeuvre separately, Figures 2 and 3 respectively showing diagrams illustrating the investigation for the two types.

Figure 2:
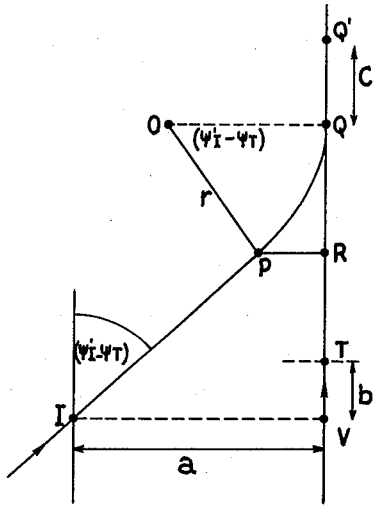
Figures 2 and 3 illustrate two specific manoeuvres, respectively, the same being shown in greater detail than in Figure 1 and with vector analyses.

The simple type of pursuit interception manoeuvre is illustrated in Figure 2. I and T are the initial positions of the interceptor and target and $V_I$ and $V_T$ are their velocities. The computation is made with reference to a pair of orthogonal axes in the plane of the interception, having their origin at I the position of the interceptor, and one of them being parallel to the target course. The coordinates of the initial target position T are $(a, b)$, the in-behind distance is $c$ and the interceptor's minimum turning radius $r$. Figure 2 shows the interceptor flying on a course $\psi_I'$ to make an interception, the angle between the target and interceptor courses therefore being equal to $\psi_I' - \psi_T$. Various other points on the diagram POQQ'R and V are referred to below, their significance being apparent from Figure 2.

The time taken for the interceptor to fly from I to Q along the course indicated is given by:

$$t_I = \frac{1}{V_I}[IP + \text{arc } PQ]$$

Now $$IP = \frac{a - PR}{\sin(\psi_I' - \psi_T)} = \frac{a - r + r \cos(\psi_I' - \psi_T)}{\sin(\psi_I' - \psi_T)}$$

$$\therefore t_I = \frac{1}{V_I}\left[\frac{a - r + r \cos(\psi_I' - \psi_T)}{\sin(\psi_I' - \psi_T)} + r(\psi_I' - \psi_T)\right] \quad (1)$$

Similarly the time for the target to fly from T to Q' is given by:

$$t_T = \frac{1}{V_I}[QQ' + QR + RV - TV]$$

But $$RV = IP \cos(\psi_I' - \psi_T)$$

$$\therefore t_T = \frac{1}{V_T}\left[c + r \sin(\psi_I' - \psi_T) + \frac{a - r + r \cos(\psi_I' - \psi_T)}{\tan(\psi_I' - \psi_T)} - b\right]$$

$$\therefore t_T = \frac{1}{V_T}\left[c - b + \frac{a - r + r \cos(\psi_I' - \psi_T)}{\tan(\psi_I' - \psi_T)} + r \sin(\psi_I' - \psi_T)\right] \quad (2)$$

When $t_T - t_I = 0$, a correct interception will be carried out. If $t_T - t_I > 0$, the quantity $(\psi_I' - \psi_T)$ should be increased, i.e. the proposed interception course is to the right of that set, and conversely if $t_T - t_I < 0$, the quantity $(\psi_I' - \psi_T)$ should be decreased. In the computer the quantity $V_I(t_T - t_I)$ is fed to the input of a servo amplifier which controls a motor to drive a shaft through angles $(\psi_I' - \psi_T)$. Equilibrium is reached and the shaft comes to rest when the equation $V_I(t_T - t_I) = 0$ is satisfied, i.e. a correct interception will be carried out.

Figure 3:
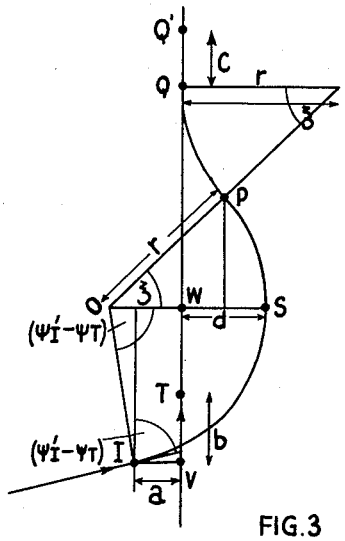

The simple type of manoeuvre worked out above, and shown in Figure 2 can only be carried out if $|a| > r[1 - \cos(\psi_I' - \psi_T)]$ which is the condition necessary for the interceptor to be able to carry out just the required final turn on to the target course from its initial position. In the other cases, a crossing course type of manoeuvre as illustrated in Figure 3 may be carried out, in which the interceptor crosses the target course during its flight to the interception point. The equations for a crossing course type of manoeuvre equivalent to Equations 1 and 2 above will now be worked out. The additional symbols used will be defined as they arise, and are indicated in Figure 3. For a crossing course type of manoeuvre:

$$t_I = \frac{1}{V_I}[\text{arc } IS + \text{arc } SP + \text{arc } PQ] \quad (3)$$

or $$t_I = \frac{r}{V_I}[(\psi_I' - \psi_T) + 2\xi]$$

(Where $\xi$ is the angle $P\hat{O}S$ as shown in Fig. 3.) Similarly $$t_T = \frac{1}{V_T}[VW - VT + WQ + QQ']$$

or $$t_T = \frac{1}{V_T}[r \sin(\psi_I' - \psi_T) - b + 2r \sin \xi + c] \quad (4)$$

$\xi$ may be evaluated as follows:

$$\cos \xi = \frac{r - d/2}{r}$$

where $d = WS$ in Figure 3. But $$d = r - a - r \cos(\psi_I' - \psi_T)$$

$$\therefore \cos \xi = \frac{1}{2} + \frac{a}{2r} + \frac{1}{2} \cos(\psi_I' - \psi_T)$$

or $\quad 2r \cos \xi = r + a + r \cos(\psi_I' - \psi_T) \quad (5)$

In the computer, Equation 5 is solved by a separate servo system in which a motor drives a shaft through angles $\xi$, the quantities $2r\xi$ and $2r \sin \xi$ of Equations 3 and 4 being fed to the main servo system for solving the equation $V_I(t_T - t_I) = 0$ for a crossing course type of manoeuvre.

In the computer the two types of manoeuvre are distinguished and the equations solved correspondingly modified. Thus in the first case if $|a| > r[1 - \cos(\psi_I' - \psi_T)]$, the flight PI (Figure 2) will become negative. A diode is connected in the circuit at a point such that if PI becomes negative, it, the diode, becomes conducting and keeps the output of that part of the computer at zero, until the condition is removed. Similarly $\xi$, which depends only on $a$, $(\psi_I' - \psi_T)$ and $r$, would become negative, i.e. meaningless if $|a| < r[1 - \cos(\psi_I' - \psi_T)]$, and an arrangement of diodes is used to limit the movement of the shaft of the $\xi$ servo system to values in the range 0–90°.

Finally it is convenient in the computer, to make $a$ always positive, so that it is not necessary to distinguish between attacks from port or starboard of the target course. This removes the necessity for a complicated switching system, all that is necessary being an arrangement whereby $|a|$ is fed to the computing elements. This arrangement means that the values of $(\psi_I' - \psi_T)$ will also be limited to the range 0–180°. Because of this some switching of the indicating system has to be carried out when $a$ becomes negative.

A computer mechanism for solving the above problems will now be described by way of example with reference to Figures 4 and 5 of the accompanying drawings, the mechanism being for use in conjunction with a P.P.I. display in a pulse radar system.

Figure 4:
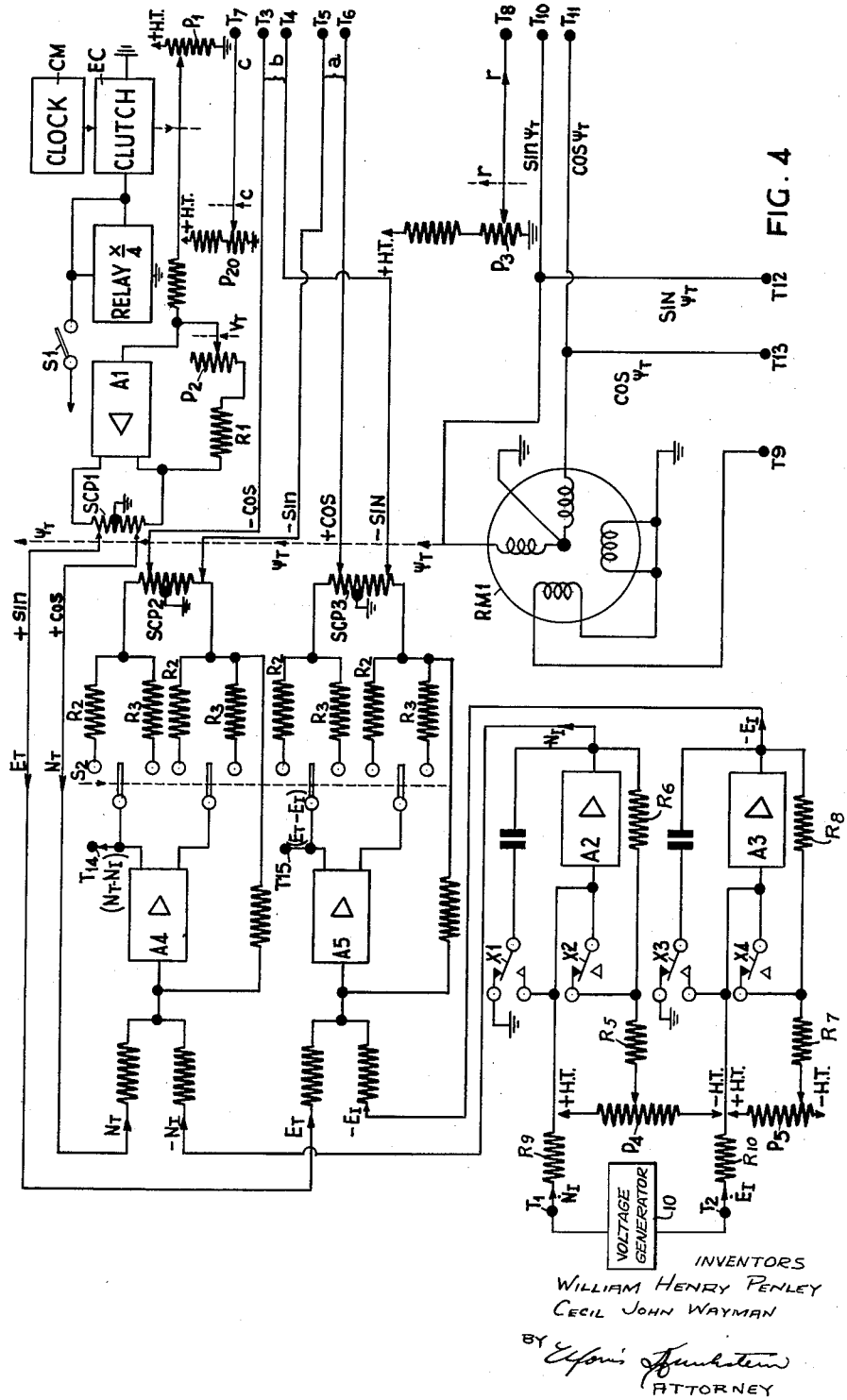

Figure 4 shows a circuit diagram of parts of the computer for deriving a number of quantities appearing in the equations to be solved, from the information available on the P.P.I. display of a search radar system mounted in the interceptor. The P.P.I. display will be assumed to be one stabilised in azimuth and position, that is one in which true North always appears at a fixed direction on the C.R.T. screen, and the display moves across the screen at a rate proportional to the speed of the interceptor, and on the same course.

The first requirement is a determination of the target course and speed, from the echo appearing on the display. To this end a target marker spot is produced on the display, the spot being positioned in dependence upon voltages developed (as subsequently described) at terminals T14 and T15. The spot is initially aligned on the echo, and a switch S1 associated with the computer is closed. This operates a relay X, and an electromagnetic clutch EC. The latter completes a mechanical drive from a constant speed clock motor CM to the shaft of a potentiometer P1, the total resistance of which is connected between a positive H.T. supply terminal and earth. The voltage at the slider of the potentiometer P1 is applied to the input of a high gain D.C. amplifier (the gain being of the order of a thousand), giving two outputs one positive and one negative and balanced with respect to earth, which are applied across the winding of a sine-cosine potentiometer SCP1. The amplifier A1 has a resistive feedback loop connected between its negative output and input including a potentiometer P2 which is in series with a fixed resistor R1. Rotation of the shaft of the potentiometer P1 and movement of the target relative to the interceptor causes the echo and the target marker spot to separate. Sometime after closing the switch S1, for example one second later, the potentiometers P2 and SCP1 are operated manually to realign the target marker spot on the echo. Thereafter it is assumed that the target course and speed remain constant at the values so determined. The resulting positions of the sliders of the potentiometers P2 and SCP1 are dependent upon the target speed $V_T$ and target course $\psi_T$ respectively and these quantities are utilized in the subsequent computation.

Since the clock motor CM drives the slider of potentiometer P1 at constant speed, the voltage on the slider is proportional to time, and, the gain of the feedback loop for amplifier A1 being proportional to $$\frac{1}{V_T}$$

the output from the amplifier A1 is proportional to $V_T \times$ time, that is the distance of the target from a datum position. By applying the output across the sine-cosine potentiometer SCP1, the shaft of which is rotated by the $\psi_T$ control, the outputs are obtained representing the co-ordinates of the target with reference to a set of orthogonal axes parallel to North and East directions. Let these be $(E_T, N_T)$. An alternative, and in some ways improved, form of tracking unit for determining the target course and speed is described in application Serial No. 461,612 for Electrical Computing Apparatus, filed October 11, 1954.

The co-ordinates of the intercepter are calculated with reference to the same axes. At terminals T1 and T2 input voltages which are supplied, as by a generator 10, and which are proportional to the north and east components of the interceptor's velocity are applied, these being $\dot{N}_I$ and $\dot{E}_I$. When relay X is unoperated the control of the output of the amplifiers A2 and A3 is almost entirely dependent on the settings of potentiometers P4 and P5, since resistors R9 and R10 are high in value compared with resistors R5, R6, R7 and R8. When relay X is operated the inputs $\dot{N}_I$ and $\dot{E}_I$ are applied through resistors R9 and R10 to the inputs of amplifiers A2 and A3. In this latter condition the feedback loops of those amplifiers are capacitative, so that the output voltages are proportional to the time integrals of $\dot{N}_I$ and $\dot{E}_I$ respectively, that is $N_I$ and $E_I$ the co-ordinates of the interceptor as required. Voltages representing the quantities $-N_I$ and $-E_I$ are fed to the inputs of the amplifiers A4 and A5 respectively.

Figure 6:
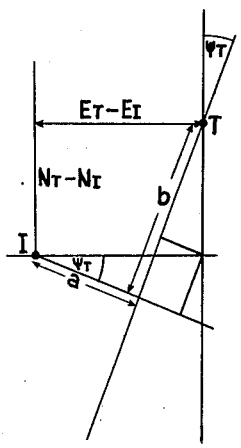
Figure 6 illustrates the derivation of certain equations which are used in the computations effected by the mechanism shown in Figures 4 and 5.

As set out above the computations are made with respect to a set of orthogonal axes having their origin at the interceptor I, one of them being parallel to the target course. Referring to Figure 6, it will be seen that $$a = (E_T - E_I) \cos \psi_T - (N_T - N_I) \sin \psi_T \quad (6)$$
$$b = (E_T - E_I) \sin \psi_T + (N_T - N_I) \cos \psi_T$$

or $$-b = -(E_T - E_I) \sin \psi_T - (N_T - N_I) \cos \psi_T \quad (7)$$

The amplifier system A4, and A5 is provided for computation of $a$ and $-b$. The slider of the potentiometer SCP1 is oriented so that the voltages on the output arms represent $+E_T$ and $+N_T$, that is if $V_0$ is the amplitude of the output voltage of amplifier A, so that the voltages at the sliders are $|V_0|(\sin \psi_T)$ and $|V_0|(\cos \psi_T)$. This is indicated in Figure 4 by the symbols +sin and +cos on the relevant leads, and a similar notation is used throughout the drawings on the various sine-cosine potentiometers employed (−sin and −cos would indicate $|V_0|(-\sin \psi_T)$ and $|V_0|(-\cos \psi_T)$). In addition the quantities represented by voltages fed over the various leads are indicated against those leads. The input to the amplifier A4 is proportional to $(N_T - N_I)$, and the feedback loop is a simple resistive one. The output is applied across a sine-cosine potentiometer SCP2.

Similarly an input $(E_T - E_I)$ is applied to the input of amplifier A5 which is connected in exactly the same way as amplifier A4, its output being applied to a sine-cosine potentiometer SCP3. The sliders of the potentiometers being arranged as indicated in Figure 4, the output at terminal T3 is proportional to $-(N_T - N_I) \cos \psi_T$ and at terminal T4 is proportional to $-(E_T - E_I) \sin \psi_T$ on the same scale, so that the sum of the voltages at terminals T3 and T4 is proportional to:

$$-(N_T - N_I) \cos \psi_T - (E_T - E_I) \sin \psi_T = -b \text{ from (7)}$$

above. Similarly the sum of the voltages at terminals T5 and T6 is proportional to:

$$-(N_T - N_I) \sin \psi_T + (E_T - E_I) \cos \psi_T = a \text{ from (6)}$$

above.

Various other voltages for feeding to the main section of the computer are obtained in the part shown in Figure 4. A potentiometer P20 is connected in a resistance chain across the positive H.T. supply and earth, and is set manually to give a voltage, at terminal T7, proportional to the required in-behind distance $c$. A potentiometer P3 is provided, connected similarly, to enable the minimum turning radius $r$ of the interceptor to be set in as a voltage at a terminal T8. The $\psi_T$ control is also used to rotate the rotor of a resolver synchro RM1, for example a magslip, across one of the stators of which an A.C. voltage is applied by connection to terminal T9. The voltages at the unearthed ends of the rotor coils are applied to terminals T10 and T11 on which appear alternating voltages proportional to $\sin \psi_T$ and $\cos \psi_T$ respectively. The terminals T12 and T13 are similarly connected to the rotor coils, these terminals being connected to an indicator showing $\psi_T$ the target heading to an operator. The voltages for shifting the target marker relative to the scan centre, representing the interceptor's position, are derived from the outputs of amplifiers A4 and A5, since, when $V_T$ and $\psi_T$ are correctly set, these are voltage proportional respectively to $(N_T - N_I)$ and $(E_T - E_I)$, the north and east components of the targets displacement from the interceptor. These outputs are taken from terminals T14 and T15 and fed to the target marker generator.

The switch S2 is part of a range change switch in the P.P.I., and is provided to alter the resistance in the feedback paths of the amplifiers A4 and A5, so that the voltage variations at terminals T12 and T13 are correctly scaled in relation to the ranges of the scan appearing on the P.P.I. The voltages applied across the potentiometers SCP2 and SCP3 do not however vary. The resistors R2 are all of one value, and the resistors R3 of another value, to maintain balance in the circuits at the two positions of the switch S2.

Provision is made for the initial setting of the target marker, before closing the switch S1, by the potentiometers P4 and P5 which are each connected between a positive and a negative H.T. supply terminal. When relay X1 is not operated, contacts X1 and X3 earth the differential feedback paths of amplifiers A2 and A3, and connect the amplifier inputs to the sliders of potentiometers P4 and P5 and to a purely resistive feedback path. Voltages dependent upon the settings of potentiometers P4 and P5 are then fed from the outputs of amplifiers A2 and A3 to the inputs of amplifiers A4 and A5, and produce voltages at terminals T14 and T15 which shift the target marker under the control of the settings of the potentiometers P4 and P5. As soon as the switch S1 is closed and the relay X operated, this no longer occurs.

The circuit diagram of the main servo system is shown in Figure 5 in which terminals T3–T8, T10 and T11 are connected to the same terminals in Figure 4. As stated previously the equation $V_I(t_T - t_I) = 0$ has to be solved, and this is done as a function of $(\Psi_I' - \Psi_T)$. For either type of manoeuvre, $V_I(t_T - t_I)$ in the form $f(\Psi_I' - \Psi_T)$ is fed to the main servo amplifier A6, the output from which controls a servo motor generator M1—G1, which drives a shaft through angles equal to $(\Psi_I' - \Psi_T)$. The generator G1 is included in known manner to provide velocity feedback to reduce hunting of the servo system. The $(\Psi_I' - \Psi_T)$ shaft is used to rotate various potentiometers in the remainder of the computer which are included in circuits for computing the various terms of $f(\Psi_I' - \Psi_T)$. The system comes to rest therefore when $f(\Psi_I' - \Psi_T) = 0$, the shaft then being at an angle equal to the value of $(\Psi_I' - \Psi_T)$ for a correct type of manoeuvre.

Considering the simple type of manoeuvre first, we have for a solution $$V_I(t_I - t_T) = 0$$

From Equations 1 and 2 for a solution $$\frac{a - r + r \cos(\psi_I' - \psi_T)}{\sin(\psi_I' - \psi_T)} + r(\psi_I' - \psi_T) - \frac{V_I}{V_T}\left[c - b + r \sin(\psi_I' - \psi_T) + \frac{a - r + r \cos(\psi_I' - \psi_T)}{\tan(\psi_I' - \psi_T)}\right] = 0 \quad (8)$$

Voltages proportional to the various members of Equation 8 are computed separately, and applied to the input of the amplifier A6. Following this through in Figure 5, a voltage proportional to $r$ is applied at terminal T8, and from this the circuit associated with amplifier A7 generates voltages proportional to the functions $r$, $-r$, $r \sin(\Psi_I' - \Psi_T)$, $r \cos(\Psi_I' - \Psi_T)$ etc. The voltage at terminal T8 is applied directly to the input of the amplifier A7, which has a resistive feedback loop. The output is applied across a sine-cosine potentiometer SCP4, the shaft of which is rotated by the $(\Psi_I' - \Psi_T)$ shaft driven by the servo motor M1. Outputs proportional to $+r$, $-r$, $r \sin(\Psi_I' - \Psi_T)$ and $r \cos(\Psi_I' - \Psi_T)$ are taken off as indicated on the circuit diagram. Voltages, whose sum is proportional to $a$, are applied at terminals T5 and T6, and thence to the input of an amplifier A8. The amplifier A8 has a resistive feedback loop and two balanced outputs, the positive one of which is selected by a contact Y1, so that an output $|a|$ is obtained irrespective of the sign of $a$. Contact Y1 is controlled by a changeover relay Y (as also are contacts Y2–Y5), the contacts Y1–Y5 each taking up one of two possible positions in dependence upon the polarity of the voltage applied to the relay Y. The input of the relay Y is connected across balanced outputs from an amplifier A9 the input of which is fed from one of the outputs of amplifier A8.

An amplifier A10 is fed at its input with voltages proportional to the quantities, $|a|$, $-r$ (one of the outputs from the circuit of the amplifier A7) and $r \cos(\Psi_I' - \Psi_T)$ (a further output from the circuit of the amplifier A7). Its outputs are connected across the winding of a sine-cosine potentiometer SCP5, the sliders of which are driven by the $(\Psi_I' - \Psi_T)$ shaft. The feedback loop of the amplifier A10 is connected to the "−sin" slider of the potentiometer SCP5, so that the full output of the amplifier A10 is proportional to the function $$\frac{a - r + r \cos(\Psi_I' - \Psi_T)}{\sin(\Psi_I' - \Psi_T)}$$

This quantity is the first member of Equation 8, and an output from the amplifier A10 is applied to the input of the amplifier A6.

The term $$\frac{a - r + r \cos(\Psi_I' - \Psi_T)}{\tan(\Psi_I' - \Psi_T)}$$

appears in the third member of Equation 8, at which the "+cos" slider of potentiometer SCP5, at which a voltage proportional to this quantity appears, is connected to the input of an amplifier A11 the circuit of which is used to derive a voltage proportional to the third member. A diode V1 is connected between the negative output of the amplifier A10 and the input, and becomes conducting if the voltage at the negative output tries to become positive with respect to the input. This could only happen if the input voltage itself becomes negative, which occurs when $a$ is too small for the first type of manoeuvre to be carried out. This being so and the equations for the crossing course type of manoeuvre not including a term of the type derived by the circuit of the amplifier A10, the diode V1, becoming conducting, reduces the output of the amplifier A10 to zero, and voltages representing such terms are not fed to the other parts of the computer. The diode V1 is thus included to take effect in the changeover from the one type of manoeuvre to the other, and in operation prevents meaningless negative quantities being fed to other parts of the computer.

Other voltages are applied to the input of the amplifier A11, representing the quantities $+r \sin(\Psi_I' - \Psi_T)$, derived from the circuit of the amplifier A7, $c$, applied at terminal T7, and $-b$, applied at terminals T3 and T4. There is one other input which is effective only in the crossing course type of manoeuvre and will not be discussed here. For the simple type of manoeuvre therefore the input to the amplifier A11 is proportional to the quantity:

$$c - b + r \sin(\psi_I' - \psi_T) + \frac{a - r + r \cos(\psi_I' - \psi_T)}{\tan(\psi_I' - \psi_T)}$$

The feedback loop includes a variable resistance potentiometer P6, which is varied in accordance with the target velocity setting $V_T$, which is made as described previously with reference to Figure 4. The full output of the amplifier A11 is therefore proportional to $$\frac{1}{V_T}$$

times the input. The output is applied across a potentiometer P7, which is varied in accordance with the interceptor speed, which is set in as a constant $V_I$ equal to the maximum speed for level flight. The voltage at the slider of the potentiometer P1 is therefore proportional to $$\frac{-V_I}{V_T}$$

times the input, the minus sign arising as the negative output of the amplifier A11 is used. This voltage is applied to the input of the main amplifier A6 and provides the third member of Equation 8.

The second member of Equation 8 is derived from a potentiometer P8, across which a voltage proportional to $r$ is applied from the output of amplifier A7. The shaft of the potentiometer P8 is driven by the $(\psi_I' - \psi_T)$ shaft so that the voltage at the slider is proportional to $r(\psi_I' - \psi_T)$. This voltage is applied to the input of the main amplifier A6, and provides the second member of the Equation 8.

A second resolver synchro RM2 is provided, the rotor of which is driven by the ($\psi_I' - \psi_T$) shaft. The stators are fed with alternating voltages proportional to sin $\psi_T$ and cos $\psi_T$ applied at terminals T10 and T11 respectively, through the contacts Y2 and Y3 which changeover the input connection to the synchro RM1 as relay Y operates. The outputs across the rotor windings and earth are alternating voltages proportional to sin $\psi_I'$ and cos $\psi_I'$, which are applied to output terminals T16 and T17 through contacts Y4 and Y5 which reverse the connections as relay Y operates. The ($\psi_I' - \psi_T$) shaft actually rotates through angles $|(\psi_I' - \psi_T)|$, since the servo system controlling it is fed with $|a|$. Since the operator requires to know $\psi_I'$ for comparison with $\psi_I$, the changeover contacts Y2–Y5 have to be included in the input and output circuits of the synchro RM2, controlled by the relay Y in dependence upon the sign of $a$. The outputs from terminals T16 and T17 are used to control a marker on the P.P.I. display and to give an indication of the course to fly on an indicator 11.

The triode V2, is fed with a voltage proportional to $r \sin(\psi_I' - \psi_T)$ on its cathode, and $r \cos(\psi_I' - \psi_T)$ on its grid. Thus, when $(\psi_I' - \psi_T)$ is approaching zero, the voltage on the control grid becomes increasingly positive with respect to that on the cathode. The triode V2 then becomes heavily conducting and the voltage at its anode drops, that is at the input of the main servo amplifier A6. This prevents the servo system running hard against the stop at the value $(\psi_I' - \psi_T) = 0$.

For a "crossing-course" type of manoeuvre, we have as before for an interception:

$$V_I(t_I - t_T) = 0$$

which from Equations 3 and 4 gives $$2r\xi + r(\psi_I' - \psi_T) - \frac{V_I}{V_T}[c - b + r \sin(\psi_I' - \psi_T) + 2r \sin \xi] = 0 \quad (9)$$

Comparing this with Equation 8 we see that the second members are the same in each case, and that, except for the last terms in them, the third members are the same.

The terms of Equation 8, which are left out, are those derived from the amplifier A10, and, as described previously, the diode V1 is provided to hold the voltages representing these terms at zero if the conditions for a "crossing course" interception hold. It remains therefore to compute the terms $2r\xi$ and $2r \sin \xi$ and add these to the inputs to the appropriate amplifiers, that is A6 and A11 respectively, when, and only when, the conditions for a crossing course type of manoeuvre arise.

The quantity is given by Equation 5 as follows:

$$2r \cos \xi = r + a + r \cos(\psi_I' - \psi_T) \quad (5)$$

A separate servo motor system is used to solve this equation, voltages representing the various terms of Equation 5 being fed in the correct senses to the input of an amplifier A12, which controls a servo motor M2. The generator G2 is included in known manner to provide velocity feedback and reduce hunting of the servo system. The motor M2 drives a shaft which comes to rest when, for a given set of values, the Equation 5 is solved and the angular displacement of the shaft is $\xi$.

Thus there are fed to the input of the amplifier A12 four voltages representing respectively the quantities $r$, obtained from an output of the amplifier A6, $a$, obtained from the output of the amplifier A8, $r \cos(\psi_I' - \psi_T)$, obtained from the "cos" slider of the potentiometer SCP4, and $(-2r \cos \xi)$, obtained from the "—cos" slider of a sine-cosine potentiometer SCP6. The potentiometer SCP6 is connected across the $+r$ and $-r$ outputs from the amplifier A7, and is driven by the $\xi$ shaft controlled by the servo motor M2. The resistor R4 is made half the value of the other resistors through which voltages are fed to the amplifier A12, to provide the necessary scaling, and introduce the factor of two.

Thus there is fed to the input of amplifier A12, a voltage representing the function $$r + a + r \cos(\psi_I' - \psi_T) - 2r \cos \xi$$

and as stated above, the $\xi$ shaft rotates until a value is reached at which this function becomes zero.

Two outputs are required from the $\xi$ circuits. One, a voltage representing the quantity $2r \sin \xi$, is taken from the "+sin" slider of the potentiometer SCP6 and fed to the input of the amplifier A11. The other, a voltage representing the quantity $2r \xi$, is taken from the slider of a potentiometer P9, which is also driven by the $\xi$ shaft. A voltage representing $(+r)$ is applied across the potentiometer P9 from the output of the amplifier A7. The voltage representing $2r \xi$ is applied directly to the input of the main servo-amplifier A6.

The only other provision to be made is that the outputs from the $\xi$ circuits are zero when the conditions for a "crossing-course" type of manoeuvre do not hold, i.e. when $\xi$ would tend to become negative and hence meaningless. For this purpose a double diode V3 is included in the circuit, the anode of one diode and the cathode of the other being connected together and to the input of the amplifier A12. The anode of the one diode is connected to the "—cos" slider of potentiometer SCP6 and the cathode of the other to the "+sin" slider of the same potentiometer SCP6, the voltages at these points representing $-2r \cos \xi$ and $2r \sin \xi$ respectively. As a result if the $-\cos \xi$ term tends to become positive, i.e. if $\xi$ tends to exceed 90°, the one diode conducts and the current flowing in it effects a voltage change at the input of amplifier A12 opposing any rotation of the shaft beyond the value $\xi = 90°$. Similarly if $\xi$ tends to decrease below 0°, the other diode conducts, opposing any further rotation. In this way the possible values of $\xi$ are held to the range 0–90°.

It will be appreciated that the computer described above with reference to Figures 4 and 5 is one example of a mechanism which may be used to solve the Equations 8 and 9, and that other types of computing mechanism may equally well be employed. Similarly the parts of the mechanism described with reference to Figure 4 for deriving the input information for the main computer circuits from the radar display may be varied.

We claim:

1. An interception computer for guiding an interceptor aircraft on one of two types of pursuit interception manoeuvre, namely the simple and the crossing course types of manoeuvre, to arrive at a predetermined in-behind distance behind and on the same course as a target aircraft, said computer comprising means to supply information as to the initial position of the target aircraft relative to the interceptor aircraft at the beginning of a computation, means to supply information as to the course of the target aircraft, means to supply information as to the speed of the target aircraft, means to supply information as to the speed of the interceptor aircraft, means to supply information as to the minimum turning radius of the interceptor aircraft, means to supply information as to the in-behind distance, means to compute from the information supplied by said information supplying means the course on which the interceptor aircraft should fly to effect the simple type of interception manoeuvre, means to compute from the information supplied by said information supplying means the course on which the interceptor aircraft should fly to effect the crossing course type of manoeuvre, course indicating means, means to determine from information supplied by said information supplying means whether the simple type of interception manoeuvre would involve the interceptor aircraft making a turn with a turning radius less than said minimum turning radius, means to select one of said two course computations in dependence upon and determined by the last mentioned means, the course associated with the crossing course type of interception manoeuvre being selected if the simple type of interception manoeuvre would have involved the interceptor aircraft in making a turn with a turning radius less than said turning radius, and means to supply to said course indicating means information as to the computed course of the interceptor aircraft selected by the last mentioned means.

2. An interception computer according to claim 1 in which the means supplying information as to the position of the target relative to the interceptor comprises means for feeding in two voltages proportional in magnitude to the components of the interceptor's velocity in two directions at right angles to one another, integrating means for deriving from the voltages fed in by the last-mentioned means two voltages which depend on the position of the the interceptor relative to a given set of axes, means for deriving two voltages which depend on the position of the target relative to the said set of axes and means for differencing the voltages supplied by the said integrating means and the last mentioned means to provide two voltages which are a measure of the instantaneous position of the target relative to the interceptor.

3. An interceptor computer according to claim 1 in which each of the means supplying information as to the speeds of the target and of the interceptor, the course of the target relative to the interceptor, the minimum turning radius of the interceptor and the in-behind distance has a part which is arranged to be moved for the purpose of changing the information supplied by the appropriate means.

References Cited in the file of this patent
UNITED STATES PATENTS

| | | |
|---|---|---|
| 2,420,017 | Sanders | May 6, 1947 |
| 2,433,843 | Hammond | Jan. 6, 1948 |
| 2,476,746 | Libman | July 19, 1949 |
| 2,600,159 | Ergen | June 10, 1952 |